Jan. 11, 1949. T. G. BARNBROOK 2,458,762
METHOD OF MAKING CAGES FOR BALL BEARINGS
Filed June 10, 1946 2 Sheets-Sheet 2
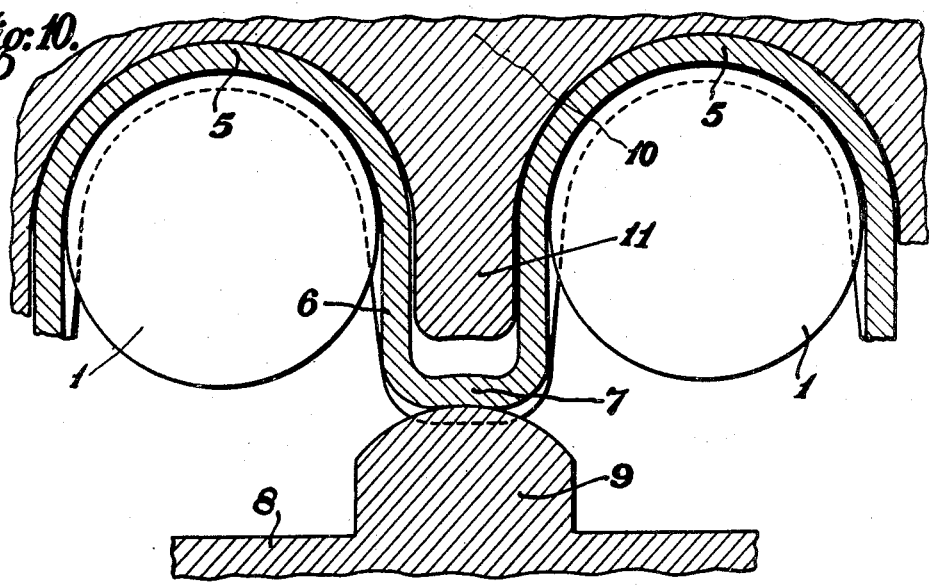
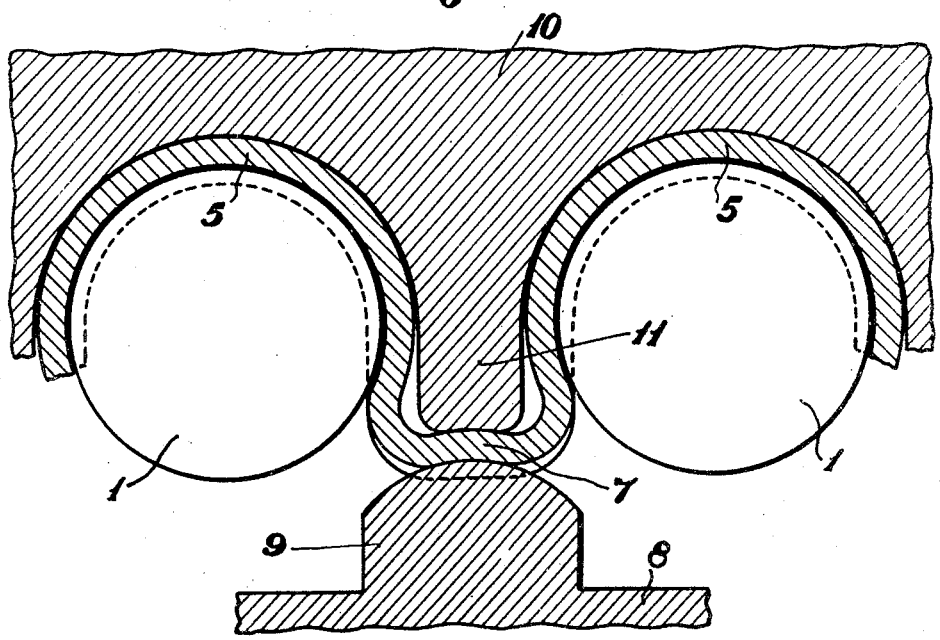
INVENTOR
Thomas George Barnbrook,
BY
HIS ATTORNEYS Patented Jan. 11, 1949

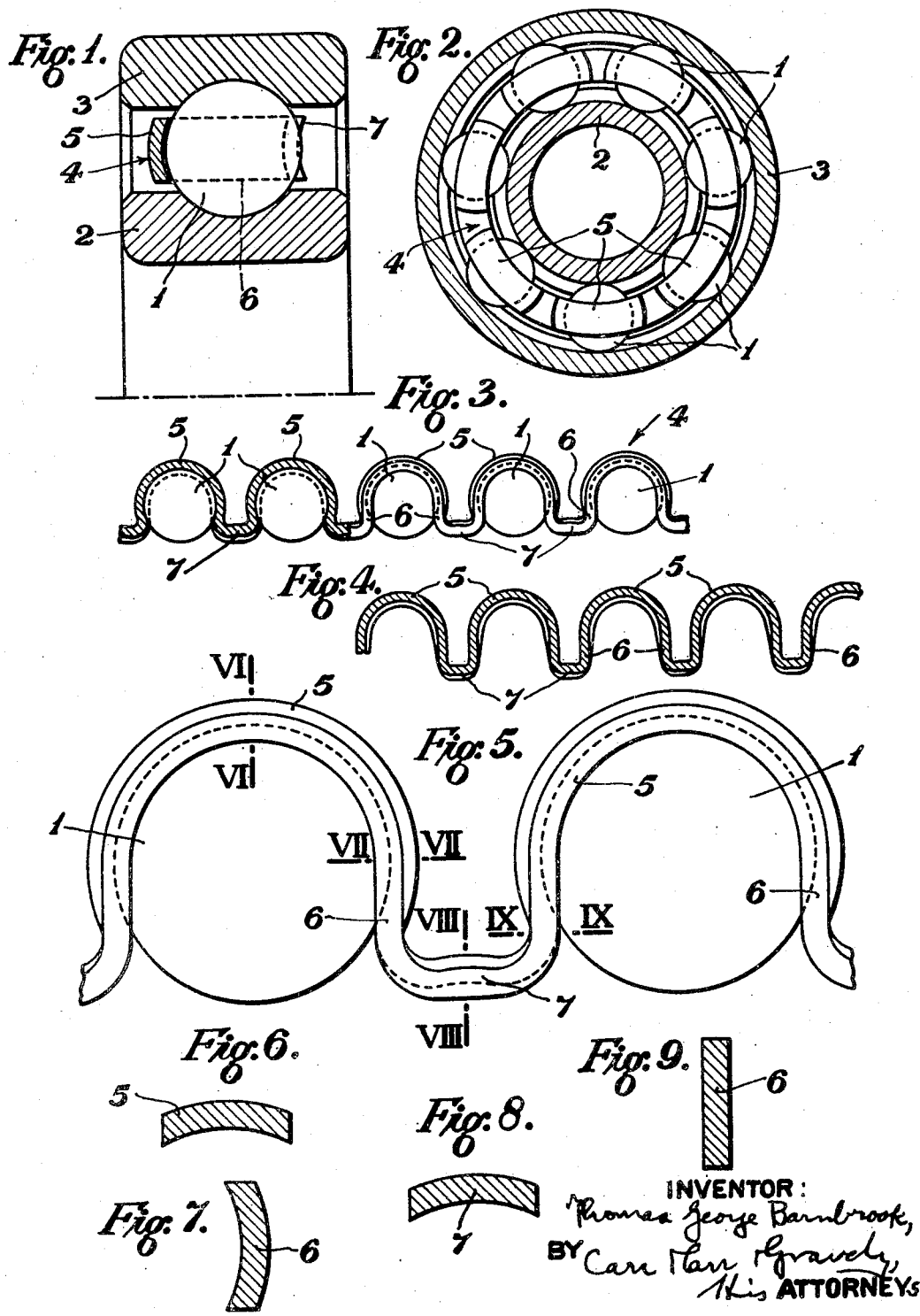

2,458,762

UNITED STATES PATENT OFFICE 2,458,762

METHOD OF MAKING CAGES FOR BALL BEARINGS

Thomas George Barnbrook, Wolverhampton, England, assignor to The Timken Roller Bearing Company, Canton, Ohio, a corporation of Ohio Application June 10, 1946, Serial No. 675,784
In Great Britain May 15, 1945

Section 1, Public Law 690, August 8, 1946
Patent expires May 15, 1965

1 Claim. (Cl. 113—117)

This invention relates to cages for ball bearings, said cages being of the kind comprising a flat sheet-metal ring bent or fashioned to produce around one face thereof a series of circumferentially-spaced loops or pockets forming separate housings for the individual balls of the bearing, the said loops or pockets being restricted at their open sides to retain the balls in place.

The principal object of the present invention is to provide a simple method of producing cages of the above kind and of assembling the same upon the balls.

According to the invention, a method of producing a ball bearing cage, of the kind referred to, and assembling it upon the balls, consists in fashioning a sheet metal ring of undulatory form with spherically-contoured open loops or pockets on one face spaced by U-shaped connecting parts the side branches of which have concave inner faces; and, after the balls have been engaged within the loops or pockets, upsetting said U-shaped connecting parts by dies or tools so as to spread the same laterally and thereby restrict the mouths or open sides of the loops or pockets and cause the side branches thereof to conform to the contour of the balls, in order to retain the cage upon the balls.

The invention also comprises a ball bearing and cage assembly in which the cage is fashioned and applied as above referred to.

Figure 1 of the accompanying drawings is a cross-section through the upper portion of a radial-load ball bearing in which the cage and balls are assembled in accordance with the present invention.

Figure 2 is a vertical section taken through the bearing members in the plane of the bearing, showing the cage in elevation.

Figure 3 represents a developed plan of a portion of the cage, partly in section.

Figure 4 is a developed sectional view through the cage in its initial form.

Figure 5 is a plan, upon a larger scale, of two of the cage pockets, when retained upon the balls.

Figure 6 represents a cross-section through the cage on line VI—VI, Figure 5.

Figure 7 is a cross-section on line VII—VII, Figure 5.

Figure 8 is a section on line VIII—VIII, Figure 5.

Figure 9 is a section on line IX—IX, Figure 5.

Figure 10 represents, in section, the tools employed for spreading the connecting portions of the cage after assembly upon the balls, the said tools being shown in position prior to the spreading operation.

Figure 11 is a similar view to Figure 10, but shows them after they have acted upon the connecting portions of the cage to spread the same.

Referring to the drawings, which illustrate the invention as applied to a radial-load ball bearing comprising a single row of balls 1 running between an inner bearing member 2 and an outer bearing member 3, the cage 4 consists of an annular sheet-metal strip forming a ring that is not edgewise substantially radially of the bearing and being crimped or corrugated in a lateral direction, parallel to the axis of the bearing, to form a series of circumferentially-spaced loops or pockets 5 all open at the same side of the ring and separated one from another by U-shaped connecting parts 6. Initially, before the cage is retained upon the balls, the strip is of the form shown in Figures 4 and 10, being of a concave radial section where it forms the loops or pockets as seen from Figure 6, and the closed or inner portions of the said loops or pockets 5 are of semi-circular shape in radial plan view, so that the interior surfaces of these loops or pockets are of spherical form to correspond to the contour of the balls they are to receive. The U-shaped connecting parts 6 between adjacent loops or pockets 5 initially have spaced parallel side branches which are tangential to the semi-circular inner portions of the loops or pockets, being at right-angles to the central longitudinal plane of the bearing, and they have concave inner faces corresponding to the circumference of the balls, their cross-sectional shape on the line VII—VII, Figure 5, being shown in Figure 7. This concave shape emerges into a flat section at line IX—IX, Figure 5, as shown in Figure 9, and the closed outer end 7 of each connecting part is preferably slightly depressed in the initial form of the cage, to a concave spherical form exteriorly, as shown in Figure 8. This portion, however, may be flat or exteriorly convex; and, if desired, a hole may be provided in the said end 7 to enable a tool to be inserted whereby any slight malformation may be corrected by leverage.

The ring (Figures 5 and 10) thus produced has loops or pockets 5 which are open at the one side of the ring for the full diameter of the balls 1 they are to receive, the sides of the outer portions being formed by the straight parallel sides of successive connecting parts 6. The balls 1 are placed between the bearing rings 2, 3 before the cage is applied, and the cage is then inserted so that the loops or pockets 5 engage the balls. The cage is then placed in a press and the end 7 of each U-shaped connecting part 6 is acted upon by dies or tools to upset the connecting part and spread the outer end portions laterally into a more or less bulbous form, as shown in Figures 3, 5 and 11, reducing the width across the mouth of each loop or pocket to less than the diameter of the ball therein and causing the previously-straight portions of the side branches 6 of the connecting parts to close or bulge inwards and to conform to the contour of the ball for a short distance outwards from the diametric plane of the balls, thus retaining the cage in place and spacing the balls.

The dies or tools are shown in Figures 10 and 11, and they comprise a member 8 having spaced projections 9 formed with convex end surfaces on which the closed ends 7 of the U-shaped connecting parts 6 are placed; and an opposed die or tool 10 shaped to fit the back of the cage ring and having projections 11 which enter the interiors of the U-shaped connecting parts, the ends of these projections stopping short of the closed ends of the U-shaped parts and having concave end surfaces which are the counter parts of the convex surfaces of the other member. When the two die or tool members 8, 10, are closed together the U-shaped connecting parts 6 are upset and spread as described above.

The concave formation of the ends 7 of the connecting parts increases the strength of the latter, but instead of being concave the said ends may be convex or flat, the parts 9, 11, of the tools being shaped to correspond. It is to be understood that the cage can be used for ball bearings of the angular contact type.

In the case of a cage for a ball thrust bearing, the cage would be undulatory in a radial direction to form outwardly-presented loops or pockets for the balls.

I claim:

A method of producing a ball-bearing cage and assembling it upon the balls of the bearing consisting in fashioning a sheet-metal ring of undulatory form with spherically-contoured loop-like pockets on one face spaced by U-shaped connecting parts the side branches of which have concave inner faces; and, after the balls have been engaged within the pockets, simultaneously upsetting said U-shaped connecting parts by spreading dies so as to spread the same laterally in order to restrict the mouths of the pockets and cause the side branches thereof to conform to the contour of the balls, the said spreading dies consisting of a multiple tool having a plurality of spaced projections adapted to engage and space the ends of the connecting parts of the cage ring, and an opposed member shaped to fit and support the back of the cage and having projections which enter the interiors of the U-shaped connecting parts, said projections having end surfaces which are opposed to the projections on the first-named member and said first-named member being moved in a direction towards the back of the cage to act upon the pockets while the said back of the cage is supported by the second-named member.

THOMAS GEORGE BARNBROOK.

REFERENCES CITED

The following references are of record in the file of this patent:

UNITED STATES PATENTS

| Number | Name | Date |
| --- | --- | --- |
| 1,474,073 | Dlesk | Nov. 13, 1923 |
| 1,537,590 | Dlesk, Jr. | May 12, 1925 |
| 1,543,320 | Cofranesco et al. | June 23, 1925 |
| 1,747,736 | Robinson | Feb. 18, 1930 |
| 1,762,891 | Rouanet | June 10, 1930 |
| 2,146,440 | Pew | Feb. 7, 1939 |